Sept. 7, 1926.
F. W. KNOTT
1,598,825
BELT FASTENING INSERTING TOOL
Filed Oct. 8, 1923    2 Sheets-Sheet 1
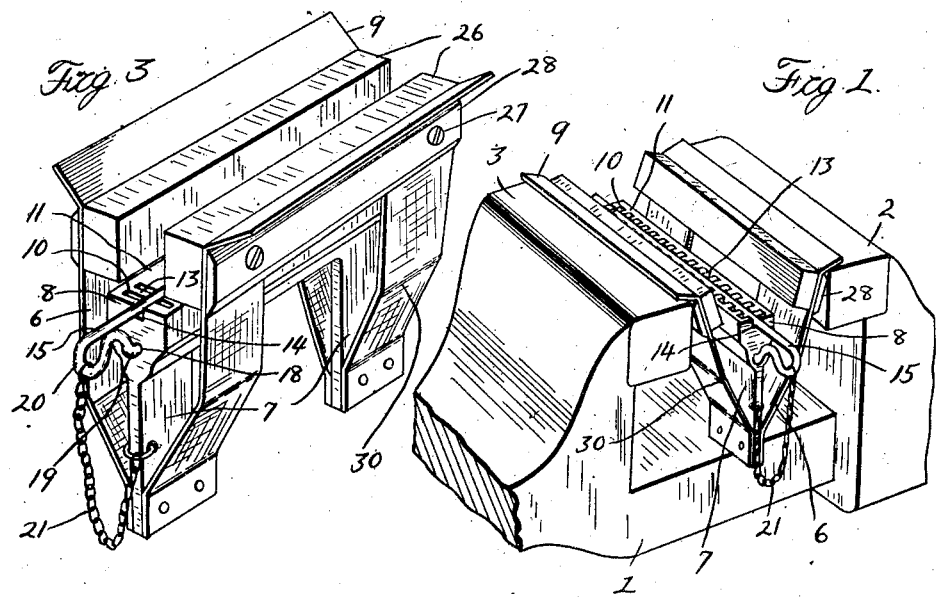
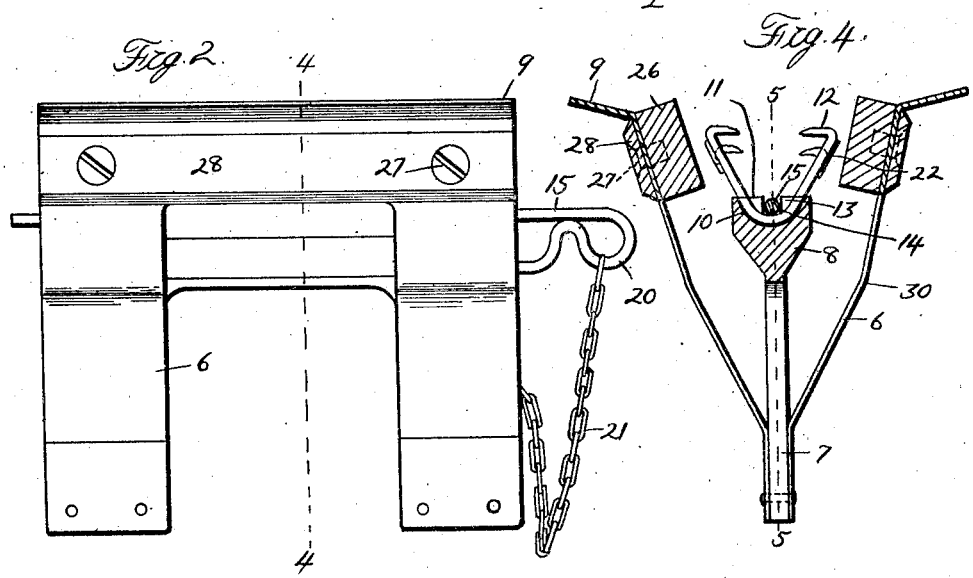
Inventor
Frank W. Knott Sept. 7, 1926.
F. W. KNOTT
1,598,825
BELT FASTENING INSERTING TOOL
Filed Oct. 8, 1923  2 Sheets-Sheet 2
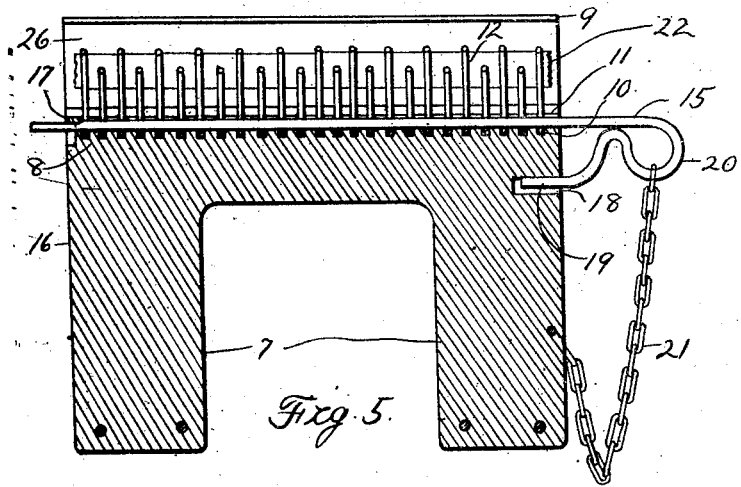
Fig. 5.
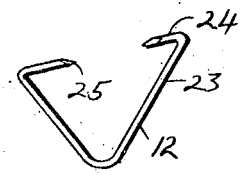
Fig. 8.
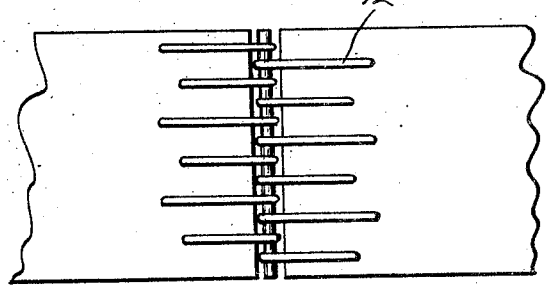
Fig. 6.
Fig. 7.
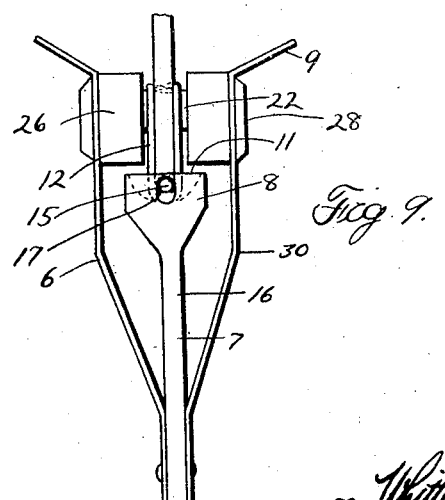
Fig. 9.
Inventor
Frank W. Knott
By Whittemore, Hulbert, Whittemore & Belknap
Attorney Patented Sept. 7, 1926.

1,598,825

UNITED STATES PATENT OFFICE.

FRANK W. KNOTT, OF DETROIT, MICHIGAN, ASSIGNOR TO DETROIT BELT LACER COMPANY, OF DETROIT, MICHIGAN, A CORPORATION OF MICHIGAN.

BELT-FASTENING-INSERTING TOOL.

Application filed October 8, 1923. Serial No. 667,368.

This invention relates to tools and refers more particularly to those having means for fastening belt hooks or staples to belts and the like.

An object of the invention is to reduce the gap between the ends of the belt joined by a belt fastener inserting tool by employing in such a tool a fastener holder from which the major portion of each fastener will project for engagement with the belt.

Another object is to provide a strong and durable tool having a pair of jaws that are preferably adapted to be supported between and closed by the jaws of any suitable vise and that are preferably adapted to be yieldably pressed against the jaws of the vise when supported thereby.

Another object is to provide a tool that is preferably constructed in such a way that the jaws thereof will always move evenly together so as to insure uniform work.

Another object is to provide a tool that is simple in construction and that can be manufactured at a comparatively low cost.

With the above and other objects in view, the invention consists in certain novel features of construction, combination and arrangement of parts as will be more fully described and particularly pointed out in the appended claims.

In the accompanying drawings:—

Figure 1 is a perspective view of a tool embodying my invention applied to the jaws of a vise;

Figure 2 is a side elevation of the tool;

Figure 3 is a perspective view of the tool;

Figure 4 is a sectional view taken on line 4—4 of Figure 2;

Figure 5 is a sectional view taken on line 5—5 of Figure 4;

Figure 6 is a detail view of the pin;

Figure 7 is a fragmentary plan view of the end portions of a belt connected together by the fasteners;

Figure 8 is a perspective view of one of the fasteners;

Figure 9 is an end view of the tool showing the jaws closed upon the fasteners and belt.

In the present state of the art it is usual to connect the ends of a belt by means of two series of spaced belt hooks or staples, the fasteners of one series intermeshing with the fasteners of the other series and being pivotally connected thereto by means of a central pin. For convenience in shipping, the individual fasteners of each series have been mounted on strips or bands of predetermined lengths and to facilitate the attachment of the fasteners these strips have been inserted as units or sections between the jaws of a suitable closing tool so that all of the fasteners of each section have been attached simultaneously to the belt. Various different forms of tools have been used to attach the fasteners to the belt, but the means for holding the fasteners in position to be attached has usually been such that when they are attached, a small portion only of each belt hook or staple grips the opposite sides of the belt, while a comparatively large portion projects outwardly from the belt for engagement with the usual connecting pivot pin. Thus, a relatively wide gap is provided between the adjacent ends of the belt and the connection is not very strong. Furthermore, various tools used heretofore have been rather complex in construction and consequently have been unduly expensive to manufacture.

With the present invention the slots in the body of the tool for receiving the fasteners are preferably relatively shallow so that only small portions of the fasteners can be inserted therein and the recesses for receiving the usual retaining pin are preferably located at the upper edges of the dividing walls of these slots. Thus, longer portions than usual of the legs of each fastener are adapted to grip the opposite sides of the belt and as a result, the gap between the adjacent ends of the belt is relatively small and a much stronger connection is obtained.

Referring now to the drawings in which like characters of reference designate corresponding parts throughout the several views, the numeral 1 designates an ordinary type of vise having a stationary jaw 2 and a movable jaw 3, the latter being preferably mounted in the usual way upon a bolt which is adapted to be rotated by a suitable handle for adjusting the jaw 3 relative to the jaw 2.

The tool embodying my invention is preferably substantially V-shape in cross-section and preferably comprises a pair of normally divergent inverted substantially U-shaped jaws 6 preferably of spring metal, which are preferably secured at their adjacent ends to opposite sides of a pair of parallel arms 7 supporting an elongated body or fastener-holder 8, and which are preferably provided at their upper free ends with laterally extending flanges 9 that are adapted to rest upon the upper faces of the jaws 2 and 3 respectively when the tool is applied to the vise.

The fastener-holder 8 is preferably provided with a series of spaced transversely extending slots 10 in the upper flat faces 11 thereof for receiving the individual fasteners 12, while each of the transverse dividing walls 13 of the slots, except a wall at one end of the fastener-holder, are provided at their upper edges with aligned recesses 14 for receiving a suitable pin 15 for retaining the fasteners in engagement with the holder. The end wall 16 is preferably provided with an opening 17 which is in alignment with the recesses 14 and which is adapted to receive the pin 15, while at the opposite end of the holder is a suitable socket 18 for receiving a projection 19 which extends forwardly from a return-bent handle portion 20 of the pin and which is preferably parallel to the pin. Thus, the pin is not likely to become accidentally disengaged from the holder when once engaged with the recesses and opening and will effectively retain the fasteners in engagement with the slots. To prevent the pin from being lost, a suitable chain 21 is preferably provided for connecting the handle portion 20 of the pin to one of the arms 7.

The fasteners are preferably grouped into sections and for this purpose are relatively positioned, preferably by corrugated strips 22 of pre-determined lengths engaging the same, and are secured from disengagement, preferably by adhesive cement. The fasteners may be any shape desired, but are preferably substantially V-shape, the divergent legs 23 thereof being preferably bent inwardly as shown at 24 and having pointed ends 25.

To drive the points of the fasteners into the belt, it is desirable to apply the maximum pressure to the outer ends of the fastener legs, therefore, I have provided a pair of elongated bearing blocks 26 which are preferably secured by means of screws 27 to the inner faces of the jaws 6 at the upper ends thereof and that are adapted to bear against the divergent legs 23 of the fasteners.

The jaws 6 are reinforced materially by the blocks 26 and are also strengthened further by means of metallic strips 28 that are secured to the outer faces of the jaws at the upper ends thereof, preferably by means of the securing elements 27 for the blocks.

In order that the adjacent faces of the blocks will be disposed parallel to each other and to the opposite sides of the belt when the jaws 6 are moved together, the said jaws are preferably bowed outwardly slightly intermediate the ends thereof as shown at 30.

In use, the tool is first positioned between the jaws of the vise so that the flanges 9 rest upon the upper faces of the jaws 2 and 3. The pin 15 is then withdrawn from the recesses 14 and opening 17 in the holder and a section of the fasteners is positioned in the slots 10. These slots are preferably spaced equal distances apart and the ends thereof are spaced equal distances from opposite edges of the holders so that the staples will be aligned accurately when positioned in the slots. After the fasteners have been positioned in the slots, the pin 15 is returned into engagement with the recesses 14 and opening 17 to hold the fasteners. The belt is then inserted between the jaws 6 of the tool, whereupon the jaw 3 of the vise may be moved toward the jaw 2 by means of a handle to move the jaws 6 toward each other and cause the bearing blocks 26 to force the pointed inwardly extending portions of the fastener legs into the leather. When the jaw 3 is moved away from the jaw 2, the spring jaws 6 will automatically move apart to permit the removal of the fasteners attached to the belt.

While it is believed that from the foregoing description, the nature and advantages of the invention will be readily apparent, I desire to have it understood that I do not limit myself to what is herein shown and described and that such changes may be resorted to when desired as fall within the scope of what is claimed.

What I claim as my invention is:—

1. In a tool of the class described, a body having means for holding belt fasteners, and a pair of resilient jaws supporting the body and carrying means engageable with the fasteners to insert the same.

2. In a tool of the class described, a body having means for holding belt fasteners, and a pair of jaws rigidly fixed to the body and carrying means engageable with the fasteners to insert the same.

3. In a tool adapted to be used in the jaws of a vise, said tool having a pair of resilient jaws supported between and movable by the jaws of the vise, and a body connected to the jaws of the tool and having means for holding belt fasteners in a position to be engaged by means associated with the jaws of said tool.

4. In a tool adapted to be used in the jaws of a vise, said tool having a pair of resilient jaws supported between and movable by the jaws of the vise, and a body carried by the jaws of the tool and having recesses for holding belt fasteners in a position to be engaged by means associated with the jaws of said tool.

5. In a tool of the class described, a pair of jaws constructed of yieldable material, a body having means for supporting a plurality of belt-fasteners, an arm carried by said jaws for supporting the body between the jaws, and means associated with said jaws for inserting the belt fasteners into the work.

6. In a tool of the class described, a pair of jaws constructed of yieldable material, a body between the jaws having means for supporting belt-fasteners in a position to be engaged by means associated with said jaws, and an arm secured to the jaws for supporting the body.

7. In a tool of the class described, a body having means for holding a plurality of belt-fasteners, an arm connected to said body, and a pair of normally divergent jaws of spring metal secured to opposite sides of said arm and carrying means adapted to engage said fasteners.

8. In a tool of the class described, a body having means for holding a belt-fastener, an arm connected to said body, a pair of jaws of spring metal secured to opposite sides of said arm and carrying means adapted to engage said fastener comprising bearing blocks secured to the adjacent faces of said jaws.

9. In a tool of the class described, a body having means for holding a belt-fastener, an arm connected to said body, a pair of jaws of spring metal secured to opposite sides of said arm and carrying means adapted to engage said fastener and means for reinforcing said jaws.

10. In a tool of the class described, a body having means for holding a belt-fastener, an arm connected to said body, a pair of jaws of spring metal secured to opposite sides of said arm and carrying means adapted to engage said fastener, and strips of metal reinforcing said jaws.

11. In a tool of the class described, a body having means for holding a belt-fastener, an arm connected to said body, a pair of jaws of spring metal secured to opposite sides of said arm and carrying means adapted to engage said fastener, and supporting flanges extending laterally from said jaws.

12. In a tool, a pair of jaws constructed of yieldable material, a body connected to said jaws and having means for holding belt-fasteners in a position to be engaged by means associated with said jaws, and supporting flanges extending outwardly from said jaws.

13. In a tool, a body having a plurality of slots in one face thereof for holding belt-fasteners and having a recess in communication with the slots, said body also having a socket out of alignment with the recess and said slots in one end thereof, and a member engageable with the recesses and having a return bent portion engageable with the socket for retaining the fasteners in engagement with the slots.

14. In a tool of the class described, a pair of jaws constructed of yieldable material and so arranged as to be supported between the jaws of a vise, a body carried by the yieldable jaws, and means on said body for holding belt fasteners in position to be engaged by means associated with the yieldable jaws.

15. In a tool of the class described, a body having a series of spaced transversely extending slots adapted to receive belt fasteners, all the walls of said slots excepting an end one having aligned recesses therein at the outer edges, said end wall having an opening in alignment with said recesses, the opposite wall having a socket out of alignment with said recesses, and a member engageable with said recesses and said opening and having a projection engageable with said socket for retaining said fasteners in said slots.

16. In a tool of the class described, a pair of resilient jaws, a body having means for holding a fastener in a position to be engaged by means associated with said jaws, and means for supporting the tool between the jaws of a vise whereby the jaws of the tool will be moved by said vise jaws.

In testimony whereof I affix my signature.

FRANK W. KNOTT.